May 1, 1962 C. E. SWENSON 3,031,792
FISH LURE
Filed Feb. 26, 1960
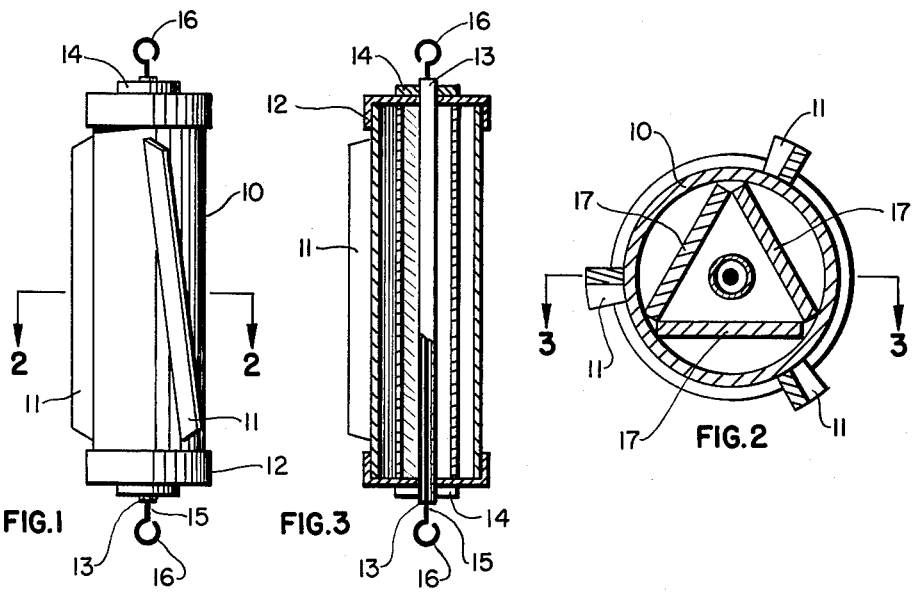
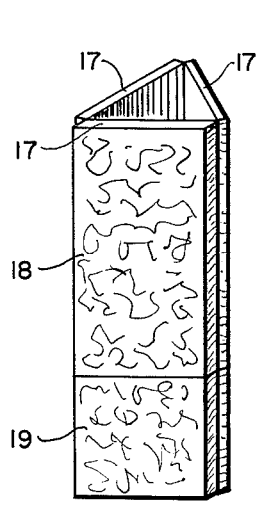
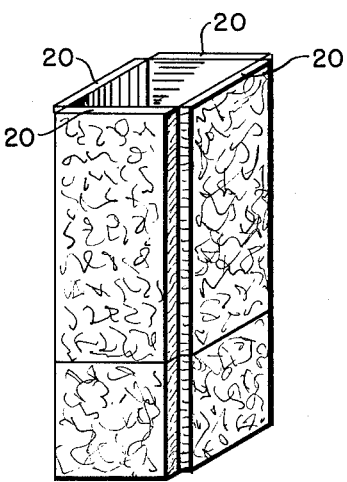
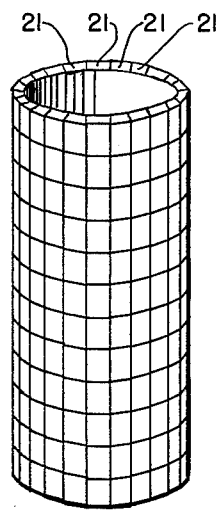
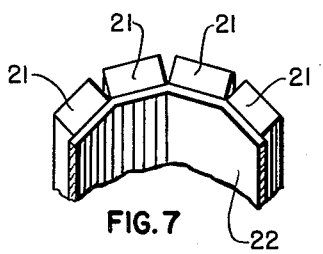
CARL ELLIS SWENSON
*INVENTOR.*
BY *M. Bjarnar*
*Atty.*

United States Patent Office 3,031,792
Patented May 1, 1962

3,031,792
FISH LURE
Carl E. Swenson, 9 Magnolia St., Bergenfield, N.J.
Filed Feb. 26, 1960, Ser. No. 11,284
1 Claim. (Cl. 43—42.2)

This invention relates to improvements in fish lures, and particularly for devices of this type containing bright reflective surfaces which revolve and thereby attract the fish.

An important object of the invention is to provide a fish lure containing bright reflecting surfaces which will not get dulled in use and which rotate and thus give a silvery reflection similar to that made by the under part of small fishes such as commonly hunted and devoured by larger fishes.

A further object of the invention is to provide a fish lure which rotates as it is pulled through the water and thereby gives a variable reflection simulating that of live bait.

Other objects and advantages of my invention will be apparent in the course of the following descriptions. In the accompanying drawing, forming a part of this specification, and in which like numerals are employed to designate like parts throughout the same:

FIG. 1 is a side elevation of a fish lure embodying my invention,

FIG. 2 is a section taken along line 2—2 in FIG. 1,

FIG. 3 longitudinal section taken along line 3—3 in FIG. 2,

FIG. 4 represents a triangular mirror assembly such as used in FIG. 2,

FIG. 5 shows a square mirror assembly which can be similarly used to the one shown in FIG. 2, FIG. 6 illustrates a circular mirror assembly which can be similarly applied, and FIG. 7 shows a detail of the circular assembly illustrated in FIG. 6.

In the drawing, wherein for the purpose of illustration, is shown a preferred embodiment of my invention, the numeral 10 designates a tubular body portion, which is preferably circular in cross section as shown in FIGURE 2. This tubular body portion is transparent and is preferably made from a suitable plastic. On the outside of the tubular body portion 10, there are a plurality of fins 11, which are fastened longitudinally to the outside of the tubular body portion 10. These fins 11, are fastened at an angle as illustrated in FIG. 1 thereby giving a propeller effect when pulled through the water, thus making the entire assembly revolve like a propeller.

Both ends of the tubular body 10, are closed by cemented water tight caps 12. A centrally located concentric tube 13 extends through the entire assembly and is cemented to the end caps 12, by means of the washer 14. A thin metallic rod 15, extends through the tube 13, and is formed into an eye 16, at each end to which the fishing line may be attached. The whole assembly is water tight thereby preventing fading and discoloration of the reflection surfaces placed inside.

Inside the plastic assembly described supra, I place a mirror assembly as illustrated in FIGURES 4 to 7. This assembly may consist of the triangular arrangement illustrated in FIGURE 4 where three identical mirrors 17, are placed together in a triangular arrangement. These mirrors are preferably of a new type having a transparent plastic front plate coated with a mirrored surface in the rear. This mirrored surface is preferably a metallic one having an irregular pattern and coming in several colors such as silver, light blue, bright red, gold etc. These mirrors are a commercial product made for other purposes. The irregular pattern of the mirror is important so as to give the illusion of a live bait. This irregular pattern is achieved by making the plastic surface full of little dimples of irregular shape thus producing a many-faceted appearance. The mirrors are preferably made from a transparent plastic, which may be clear or colored, and having an electro-deposited mirror coating on one side. As indicated in the drawing, the upper portion 18, may be silver while the lower portion 19, may be light blue etc. By having different colors in the same assembly, the reflections are more alluring and similar to those of a live bait.

In FIGURE 5 is shown a similar assembly of square shape where the four mirrors 20, of identical size but of different colors are fastened together by being glued on a square tube of a cloth fabric.

In FIGURES 6 and 7 is illustrated an assembly for the same purpose, but being circular in cross section. This assembly is made up of a number of many faceted strips of mirrors 21, all of similar size and these may either all be of one color or may also be of different colors. These mirror strips 21 are cemented on a cloth fabric 22, which holds them together in a substantially circular cross section as illustrated in large scale in FIGURE 7.

The operation of my invention is as follows:

A regular swivel of the type commonly used in fishing tackle is attached to each of the eyes 16, and the fishing line is fastened to one of the swivels and the hook and sinker to the other. When the fishing line now is pulled through the water, the fish lure will be rotated by the fins 11, and the mirrored surfaces 17, will reflect and give the illusion of a moving live bait. This will lure the fish to investigate and the fish will thus come into the proximity of the trailing hooks and will be caught.

It is to be understood that the forms of my invention, herewith shown and described, are to be taken as a preferred example of the same and that various changes in the shape, size and arrangement of parts may be resorted to, without departing from the spirit of my invention or the scope of the subjoined claim.

Having thus described my invention, I claim:

In a fish lure the combination of a finned transparent body; a multifaceted assembly placed longitudinally in said body, said assembly comprising a flexible fabric support of suitable shape having cemented thereto a plurality of rigid, plastic, multifaceted, multicolored mirrors, thereby forming a substantially rigid assembly; a cap sealing each end of said transparent finned body; a smaller diameter tubular member forming an axial bore though said body placed longitudinally within said assembly, and a thin rod formed into a hook at each end extending through said tube.

References Cited in the file of this patent
UNITED STATES PATENTS

| | | |
|---|---|---|
| 272,317 | Pflueger | Feb. 13, 1883 |
| 2,163,666 | Carter et al. | June 27, 1939 |
| 2,592,445 | McCarthy | Apr. 8, 1952 |
| 2,599,035 | Wing | June 3, 1952 |
| 2,694,877 | Wise | Nov. 23, 1954 |
| 2,753,650 | Rentz et al. | July 10, 1956 |